United States Patent [19]

Marteau d'Autry

[11] 4,229,413

[45] Oct. 21, 1980

[54] ADJUSTABLE DEVICE FOR DISTRIBUTING LIQUID SAMPLES

[76] Inventor: Eric Marteau d'Autry, 69-72 rue Gambetta, 95 Villiers-le-Bel, France

[21] Appl. No.: 898,548

[22] Filed: Apr. 21, 1978

[30] Foreign Application Priority Data

Apr. 27, 1977 [FR] France ............................... 77 12696

[51] Int. Cl.[3] ........................... B01L 3/02; G01N 1/14

[52] U.S. Cl. .................................... 422/100; 73/425.6; 222/380

[58] Field of Search .......................... 422/63, 100, 103; 73/425.6; 222/380, 383

[56] References Cited

U.S. PATENT DOCUMENTS

| | | | |
|---|---|---|---|
| 3,461,805 | 8/1969 | Karkow | 222/380 X |
| 3,572,130 | 3/1971 | Goldsmith | 422/100 X |
| 3,800,984 | 4/1974 | Phelan | 422/100 |
| 3,827,305 | 8/1974 | Gilson et al. | 73/425.6 |
| 3,948,607 | 4/1976 | Atwood et al. | 422/63 |
| 3,955,930 | 5/1976 | Shapiro | 422/50 |
| 4,003,499 | 1/1977 | Shapiro et al. | 73/425.6 X |
| 4,011,685 | 3/1977 | Boyd et al. | 422/100 X |

*Primary Examiner*—Joseph Scovronek

*Attorney, Agent, or Firm*—Mason, Kolehmainen, Rathburn & Wyss

[57] ABSTRACT

The present invention relates to an adjustable device for distributing liquid samples, comprising a casing incorporating a mechanism for adjusting the volume and a volume indicator unit; a tip member which comprises a lateral supply tube, provided with means allowing the tight adaptation of a reservoir; a measuring chamber arranged in said tip member so as to receive, with a slight clearance, a calibrated piston elastically urged upwardly and the upper end of which cooperates with a stop for limiting the upward stroke, adjustable in position by means of the adjusting mechanism; a control shaft, of which the lower end cooperates with the upper end of the calibrated piston and means ensuring the tightness of the measuring chamber. The invention finds particular application to the continuous distribution of liquid.

16 Claims, 3 Drawing Figures

ADJUSTABLE DEVICE FOR DISTRIBUTING LIQUID SAMPLES

The present invention relates to an adjustable device for distributing liquid samples, which enables variable volumes of the same liquid to be continuously distributed.

The device forming the subject matter of the present invention therefore makes it possible to eliminate all the liquid sample-drawing operations, which were heretofore necessary before proceeding with each distribution of the sample.

As, in the laboratory, it is very often necessary to proceed with several successive distributions of the same liquid, the decisive interest of the subject matter of the present invention appears very clearly, in view of the fact that it eliminates all the manual sample-drawing operations.

The adjustable device for distributing the liquid sample according to the invention comprises, in combination:

- a casing incorporating a mechanism for adjusting the volume of liquid samples to be distributed, as well as a volume indicator unit coupled with said mechanism;
- a lower tip member terminating in a tapering end, which is fast with said casing and which comprises a lateral supply tube, itself provided with a first non-return valve and with means allowing the tight adaptation of a reservoir or like member containing said liquid sample to be distributed;
- a measuring chamber arranged in said tip member, so as to receive, with a slight clearance, a calibrated piston which may reciprocate in said chamber and in the lower part of the casing, which is elastically urged upwardly and the upper end of which cooperates with a stop for limiting upward stroke, adjustable in position by means of the adjusting mechanism, said chamber communicating on the one hand near its upper end, with said tube and, on the other hand, at the lower tapered end of the tip member, with the outside medium with the interposition of a second non-return valve;
- a control shaft, the upper end of which, opening in the upper part of the casing, presents a push button and the lower end of which cooperates with the upper end of the calibrated piston, said shaft being equipped with retaining means adapted to prevent its upward escape; and
- means ensuring the tightness of the measuring chamber, near its upper end and above the inlet of said lateral supply tube into the chamber.

According to a further feature of the invention, the mechanism for adjusting the volume of liquid samples comprises a hollow, externally threaded shaft cooperating with an internally threaded insert, fixed so as to be immobile in rotation and in translation inside said casing, as well as a nut for driving said hollow, threaded shaft in rotation, adapted to be actuated from outside the casing with a view to modifying the vertical position of said stop for limiting the upward stroke of the piston, the control shaft passing through said hollow externally threaded shaft.

According to a further feature of the invention, the volume indicator unit is constituted by a plurality of volume indicator rings each bearing indices visible through a window made in said casing, said rings being fixed on said hollow threaded shaft so as to surround it and allow it a reciprocating movement through the rings which are, moreover, equipped with drive means adpated to control the relative movement of said rings as a function of the movement of rotation of the hollow threaded shaft.

According to another feature of the present invention, the device comprises an elastic stop chamber arranged in the upper part of the lower tip member, this chamber in particular enabling the measuring chamber to be bled and the device to be primed.

The invention will be more readily understood on reading the following description with reference to the accompanying drawings, in which.

Figure 1:
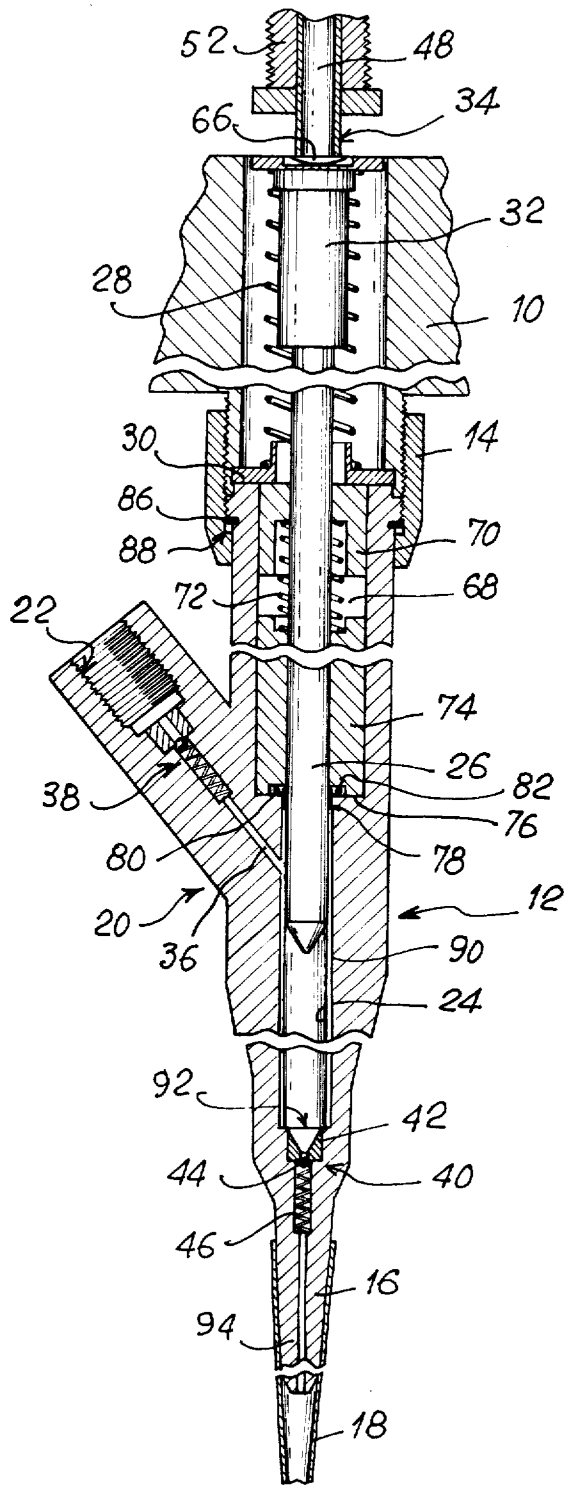
FIG. 1 shows a view in section of the lower part of the device forming the subject matter of the present invention.
Figure 2:
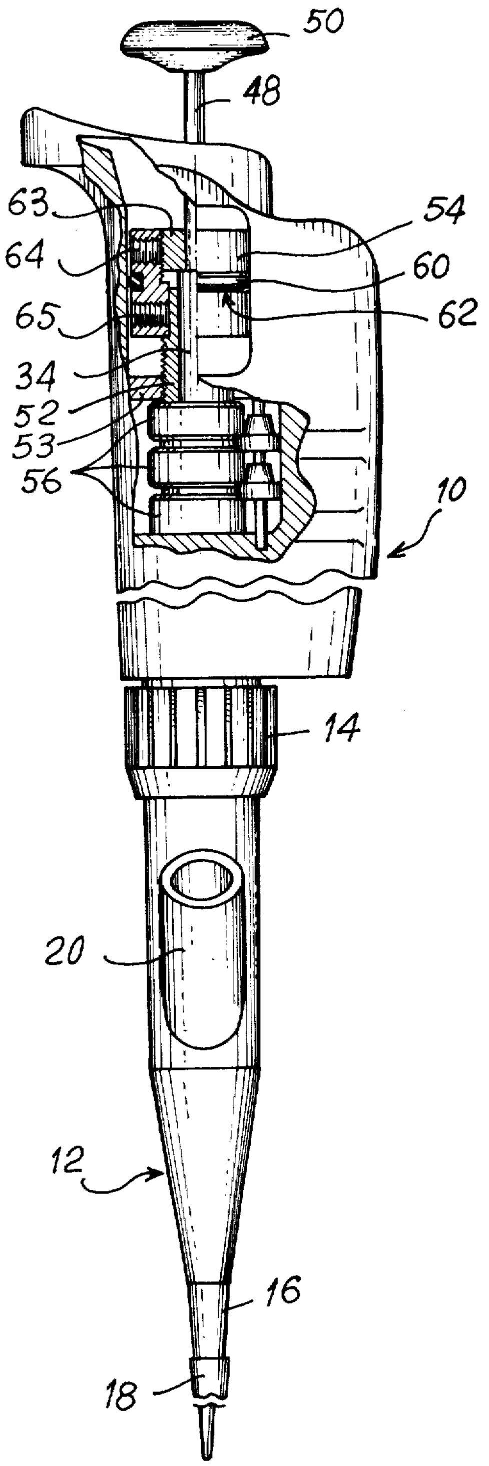
FIG. 2 shows a side view of the device of the invention, with part of the wall of the casing torn away.
Figure 3:
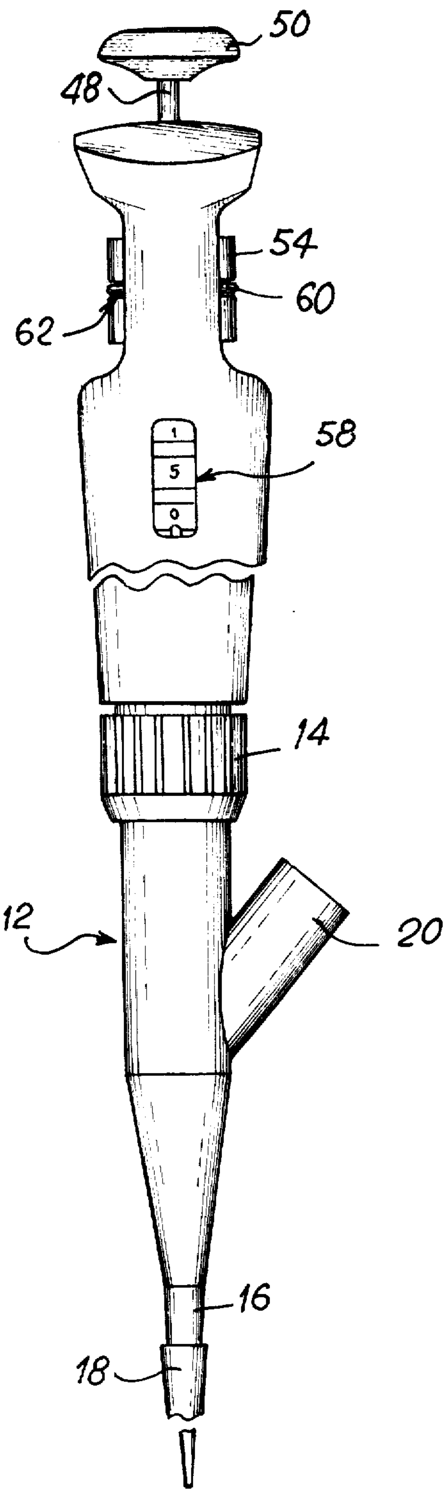
FIG. 3 shows a front view of the device of FIG. 2.

Referring now to the drawings, FIG. 1 shows the adjustable device for distributing liquid samples according to the invention, which is hereinafter designated as "device", which comprises a casing 10 and a lower tip member 12 fast with the casing 10 by means of a nut 14. The casing 10 incorporates a mechanism for adjusting the volume of liquid samples to be distributed, as well as a volume indicator unit, coupled with said adjusting mechanism. The lower tip member 12 terminates in its lower part in a tapered end 16 adapted to allow the introduction of the device into tubes or flasks whose opening or neck is relatively narrow. This tapered end 16 may be covered by a removable cone 18, placed solely for protection purposes.

According to an essential feature of the invention, said lower tip member 12 comprises a lateral supply tube 20. This tube 20 presents means allowing the tight adaptation of a reservoir or other like members containing the liquid to be distributed. These means may advantageously be in the form of an orifice provided with an inner thread 22.

The lower tip member 12 also comprises a measuring chamber 24 adjusted so as to receive, with a slight clearance, for example of the order of 2/10 mm, a calibrated piston 26 which may reciprocate in said chamber 24 and in the lower part of the casing 10. The calibrated piston is conventionally elastically urged upwardly by means of a main return spring 28 capable of being compressed between a guide 30 and a stop 32 fast with the upper part of the calibrated piston 26. The lower surface of the guide 30 is in permanent abutment on the upper surface of the end of the tip member 12.

The upper end of the calibrated piston 26, i.e. in fact the stop 32, cooperates with a stop 34 limiting the upward stroke, the vertical position of which may be adjusted with precision by means of said adjusting mechanism integrated in the casing of the device.

The measuring chamber 24 communicates with the lateral tube 20 by means of a conduit 36 opening in the upper part of the chamber 24 and in which is mounted a first non-return valve 38, mounted so as to avoid any outlet of the liquid contained in the chamber 24 through conduit 36. At the lower tapered end 16 of the tip member 12, the measuring chamber 24 communicates with the outside medium with the interposition of a second non-return valve 40. The non-return valves 38 and 40 are made in conventional manner and may, for example, be constituted by a valve seat 42 for example made of sapphire or ceramics, on which is adapted a ball 44 controlled by a small spring 46. The ball 44 may, for example, advantageously be made of alumina and the spring 46 of Teflon-coated stainless steel or platinum containing iridium.

In order to control the movements of the calibrated piston 26, the device of the invention comprises a control shaft 48 provided, at its upper end opening in the upper part of the casing 10, with a push button 50. The lower free end of the control shaft 48 cooperates with the upper end of the calibrated piston 26, said shaft 48 being provided with retaining means intended to prevent its escape to the outside through the top of the casing of the device.

It is, furthermore, indispensable to provide said device with means ensuring the tightness of the measuring chamber 24 with respect to the outside medium, near its upper end and above the inlet of said lateral supply tube 20.

Concerning the mechanism for adjusting the volume of liquid samples and the volume indicator unit, it should be noted that the latter are of the general type as described in detail in French Pat. No. 73 32978 of Sept. 13, 1973. The mechanism for adjusting the volume of liquid samples thus comprises a hollow, externally threaded shaft 52 cooperating with an internally threaded nut or insert 53, fixed so as to be immobile in rotation and in translation inside the casing 10. Such an adjusting mechanism further comprises a nut 54 for driving the hollow, externally threaded shaft 52 in rotation, this nut 54 being adapted to be actuated from outside the casing 10 with a view to modifying the vertical position of the stop limiting the upward stroke of the calibrated piston 26. In such an embodiment, said control shaft 48 passes completely through said hollow, externally threaded shaft 52.

The volume indicator unit is constituted by a plurality of volume indicator rings 56, each bearing indices visible through a window 58 arranged in the casing 10. Said rings 56 are fixed on the hollow, externally threaded shaft 52 so as to surround it and allow it a relative movement through said rings which are, moreover, provided with drive means adapted to control the relative movement of the rings 56 as a function of the movement of rotation of the hollow, threaded shaft 52.

In order to immobilise the hollow threaded shaft 52 in the position chosen by the operator, the device comprises means for locking said hollow shaft 52. The locking means are advantageously constituted by a braking ring 60 compressed between the inner surface of the casing 10 and a groove 62 made in the outer surface of the nut 54 for driving said hollow, threaded shaft 52 in rotation. Such a braking ring is advantageously made of a supple, elastically deformable material, resisting wear and tear, such as for example a fluorocarbon resin, polychloroprene or, preferably, polyurethanes.

According to a particular embodiment illustrated in the accompanying drawings, the stop limiting the upward stroke of the calibrated piston 26 is constituted by a sheath 34 sliding on said control shaft 48, internally with respect to the hollow threaded shaft 52. As may be seen in FIG. 1, the lower end of the sheath 34 slightly protrudes beyond the lower end of the hollow, externally threaded shaft 52, the vertical position of this sheath 34 being controlled by the rotation of the hollow threaded shaft 52, as is described, for example, in greater detail in French Pat. No. 73 32978. Such an arrangement of the stop 34 enables the relative position of the stop limiting the upward stroke of the piston 26 to be adjusted with respect to the hollow threaded shaft 52, with a view to adjusting the indicator rings 56 as a function of the precise position of said stop limiting the upward stroke. This particular arrangement is intended to ensure the precision of the indication given by the volume indicator unit, i.e., to ensure in fact a very precise adjustment of the zero of the device which is generally effected when assembled in the factory. This adjustment of the zero is obtained wth high precision, once the hollow threaded shaft 52 has been screwed in low position, by acting on the flat screw 63, of which the displacement in the nut 54 is rendered possible by unscrewing the three bronze set screws 64 spaced apart by 120° with respect to one another. It will be noted that the three set screws 65 made of stainless steel are furthermore intended to lock the nut 54 on the hollow threaded shaft 52.

In the embodiment described, the retaining means which are adapted to prevent the upward escape of the control shaft 48, are for example constituted by an enlarged lower end 66 of said control rod 48. This enlarged lower end 66 makes it possible, by cooperation with the lower end of the sheath 34, to prevent the escape of said shaft 48 through the top of the casing 10. The cooperation between the enlarged lower end 66 of the control shaft 48 and the upper stop of the calibrated piston, namely for example the sheath 34, may be obtained in the form of a set screw cooperating, moreover, with a housing of similar form, made in the stop 32 of the piston 26, or in the form of a spherical cap abutting on a plane, as illustrated for example in FIG. 1.

According to another essential feature of the present invention, the device further comprises an elastic stop chamber 68 arranged in the upper part of the low tip member 12. The main purpose of this elastic stop chamber 68 is to bleed the measure chamber 24 as well as prime the device. The elastic stop chamber 68 comprises an elastic stop 70 adapted to move in said chamber against an upwardly directed elastic return force exerted by a stop spring 72. It is clear that the return force exerted by the stop spring 72 must be at least substantially stronger than that exerted by the main return spring 28 which urges the calibrated piston 26 elastically upwardly, so as to give the operator a real impression of downward stop when the main return spring 28 is compressed to a maximum. The stop spring 72 is positioned between said elastic stop 70 and a seal seat 74, the lower end of which comes into abutment on a shoulder 76 made in said lower tip member 12. In order simultaneously to ensure a good tightness of the measuring chamber 24 and a cleaning of the calibrated piston 26 during its upward return stroke, a seal 78 is provided, preferably made of Teflon, interposed at the shoulder 76 between the calibrated piston 26 and the upper part of the inner wall of the tip member 12 determining the measuring chamber 24. At this same spot, there is also provided an O-ring 80 compressed between the upper surface of the shoulder 76 and an inner groove 82 made in the inner surface of the lower end of the seal seat 74.

The lower tip member 12 and the casing 10 are connected by means of a nut 14 fixed on the upper part of the lower tip member 12, with the possibility of rotation of the nut 14 with respect to the tip member 12. This mode of fixing the nut 14, whilst conserving a degree of freedom of rotation, may for example be effected, as indicated in FIG. 1, by means of a ring 86 fixed near the upper end of the lower tip member 12, the ring 86 cooperating with a groove 88 made on the inner surface of the nut 14. The upper part of the internally threaded nut 14 is therefore intended to be screwed on a corresponding thread of the lower part of the casing 10. It is advantageous to conserve a degree of freedom of rotation of the nut 14 with respect to the lower tip member 12, so as to be able to swivel the lateral supply tube 20, as desired, with respect to the casing 10.

The device according to the invention may therefore be used in the following way. A small bottle or any like flask constituting a reservoir of liquid to be distributed, provided with an air inlet, is firstly adapted on the threaded end 22 of the lateral supply tube 20. Such a recipient may be mounted directly on the threaded tip member or be connected to the lateral supply tube 20 by any standard type of connection such as a needle, a male or female Luer connection, a tapped union, a conical union, etc. . . . Once the recipient containing the liquid is connected to the lateral supply tube 20, a pressure is exerted on the push button 50, so as to cause the calibrated piston 26 to descend against the force exerted by the main spring 28 and by the small spring 72 with a view to bleeding the air from the measuring chamber 24. It should be noted on this point that the calibrated piston 26, the stop and elastic return springs 72 and 28, as well as the measuring chamber 24 must be of such dimensions that, during the maximum downward stroke of the calibrated piston 26, i.e., when the two springs 28 and 72 are compressed to a maximum, the lower end 90 of the calibrated piston 26 must reach the lower wall 92 of the measuring chamber 24, so as to be able to bleed said latter completely.

In a preferred embodiment of the device according to the invention, the lower end 90 of the cabibrated piston 26 takes a truncated form, the lateral surface of which is preferably strongly inclined, whilst the valve seat 42 presents in its upper part a shape complementary of the truncated form of the lower end 90 of the calibrated piston 26. The complementary forms of the lower end 90 and of the valve seat 42 are designed, as shown in FIG. 1, so that the lower end 90 of the calibrated piston 26 comes near the ball 44 without, however, coming into contact with this latter, when said piston occupies the lowest position. This particular embodiment allows a perfect air bleeding of the measuring chamber 24. In fact, it is thus possible to prime the device, avoiding any formation of air bubbles, without it being necessary to turn the whole of the device over, this having to be avoided at all costs in the case of manipulating corrosive or radio-active liquids. The second non-return valve 40 is mounted so as to allow the escape of the air or liquid contained in the measuring chamber 24. When no more force is exerted on the control rod 48, said latter rises at the same time as the calibrated piston 26, under the action of the elastic springs 28 and 72, thus creating a pressure drop or vacuum within the measuring chamber 24. This pressure drop provokes the opening of the first non-return valve 38 which thus allows passage of the liquid in the measuring chamber 24. By repeating this operation two or three times, the device is perfectly primed, i.e., the liquid to be distributed occupies the channel 36, the measuring chamber 24, the lower conduit 94, as well as the inner volume of the cone 18. As the adjustment of zero was effected once and for all upon manufacture, it then suffices to display the volume which it is desired to distribute, by acting on the nut 54, then to exert a pressure on the push button 50 of the control shaft 48, so as to cause the calibrated piston to descend inside the measuring chamber 24 by a predetermined stroke corresponding to the desired volume. The force exerted on the control shaft 48 and consequently on the piston 26 must be interrupted at the moment when the resistance of the first spring 28 is entirely overcome and before the compression of the second spring 72 is begun. It is, therefore, important, for this end of stroke corresponding to the compression of the spring 28 to be easily locatable, to employ two stop and return springs 72 and 28 endowed with different resistances. When the volume chosen has been distributed, the piston 26 rises again under the action of the elastic force of the main spring 28, this creating a pressure drop or vacuum in the measuring chamber 24 which is therefore automatically resupplied with liquid due to the opening of the valve 38. This arrangement, therefore, enables continuous distributions of different batches of the same volume of the same liquid to be effected, the actual drawing operations thus being eliminated.

It is clear from the explanation of operation of the device, indicated hereinabove, that the presence of a slight clearance, for example of the order of 2/10 mm, between the calibrated piston 26 and the measuring chamber 24 is absolutely imperative, precisely with a view to allowing the supply of liquid to the measuring chamber 24 which must function as a liquid stream exempt from air.

The device according to the invention may also be provided, at its supply tube 20, with a syringe which, by pressure exerted on the plunger thereof, makes it possible to create a forced circulation of the liquid contained in the syringe through the channel 36, the measuring chamber 24, the lower conduit 94 and the inner volume of the cone 18. The adaptation of such a syringe may be effected either with a view to a washing operation of the parts soiled by a preceding liquid, or to normal functioning, as described previously, and in this latter case it is clear that the priming operation of the device may very easily be carried out by acting directly on the plunger of the syringe.

Furthermore, it should also be noted that, in place of the flask fixed directly on the lateral tube 20, a carboy or any other large capacity reservoir may be adapted, for example by means of a supple union thus allowing the free movements of the device despite the permanent fixation of the carboy on the bench. The same application in obviously advantageous in the case of proceeding with very numerous distributions of samples of the same liquid. In such a case, the actual drawing operations being eliminated, any risk of contamination of the liquid by the outside medium, with respect to which the liquid is perfectly insulated, is thus eliminated. A similar application is very advantageous in the case of distributing sterilised liquid or in the case of liquid of which the strength or degree of oxidation might be disturbed during the drawing operations, due to the opening of the reservoir.

It is clear that another advantage of the device of the invention is that of allowing the simple and rapid disconnection of the lower tip member 12 and the casing 10, with a view to any decontamination or sterilisation operation. Such an operation is made only on the lower tip member 12 and therefore does not risk deteriorating the sensitive members of the device, which are grouped inside the casing.

What is claimed is:

1. An adjustable device for distributing liquid samples, comprising, in combination:

a casing incorporating a mechanism for adjusting the volume of liquid samples to be distributed, a volume indicator unit coupled with said mechanism;

a lower tip member terminating in a tapering end, said casing including a lateral supply tube, provided with a first non-return valve and means for allowing tight holding of a reservoir containing said liquid sample to be distributed;

a measuring chamber arranged in said tip member for receiving, with a slight clearance, a calibrated piston reciprocally mounted in said chamber and in the lower part of the casing, said piston being elastically urged upwardly, the upper end of said piston cooperates with a stop for limiting upward stroke, said piston being adjustable in position by means of said adjusting mechanism, said chamber communicating near its upper end with an outside medium with the interposition of a second non-return valve;

a control shaft including a push button at the upper end thereof and the lower end of said control shaft cooperates with said upper end of the piston, said shaft including retaining means for preventing upward escape of said shaft; and means for ensuring the tight holding of the measuring chamber, near its upper end and above the inlet of said lateral supply tube, said mechanism for adjusting the volume of liquid samples comprises a hollow, externally threaded shaft cooperating with an internally threaded insert, fixed so as to be immobile in rotation and in translation inside said casing thereby immobilizing said threaded shaft, as well as a nut for driving said hollow, threaded shaft in rotation, said nut actuated from outside the casing for modifying the vertical position of said stop for limiting the upward stroke of the piston, the control shaft passing through said hollow externally threaded shaft.

2. The device of claim 1 wherein the volume indicator unit comprises a plurality of volume indicator rings each bearing indices visible through a window in said casing, said rings being fixed on said hollow threaded shaft so as to surround said shaft and allow reciprocating movement through the rings which are equipped with drive means adapted to control the relative movement of said rings as a function of the movement of rotation of the hollow threaded shaft.

3. The device of claim 1 further comprising means for locking said hollow threaded rod adapted to immobilise said rod in the chosen position.

4. The device of claim 3, wherein said means for locking said hollow threaded shaft comprises a braking ring compressed between the inner surface of the casing and a groove in the outer surface of the nut for driving said hollow threaded shaft in rotation.

5. The device of claim 4, wherein, said braking ring being fabricated of elastically deformable material.

6. The device of claim 1 wherein the stop limiting the upward stroke of the piston comprises a sheath slideably mounted on said control shaft, internally with respect to the hollow threaded shaft, and the lower end of said sheath slightly protrudes beyond the lower end of the hollow externally threaded shaft, the vertical position of this sheath being controlled by the rotation of the hollow threaded shaft.

7. The device of claim 6, wherein the stop limiting the upward stroke of the piston is adjustable relative to the hollow threaded shaft, for adjusting the indicator rings as a function of the precise position of said stop limiting the upward stroke of the piston.

8. The device of claim 6, wherein said retaining means, intended to prevent the upward escape of the control shaft, comprises an enlarged lower end of said control shaft, cooperating with the lower end of said sheath.

9. The device of claim 1, further comprising an elastic stop chamber arranged at the upper part of the lower tip member comprising an elastic stop movably mounted in said chamber against an upwardly directed return force, exerted by a stop spring.

10. The device of claim 9, wherein the return force exerted by the stop spring is stronger than the force exerted by the spring which urges said calibrated piston upwardly.

11. The device of claim 9, wherein the stop spring is placed between said elastic stop and a seal seat, the lower end of which abuts on a shoulder in said tubular tip member.

12. The device of claim 11, wherein said means for ensuring the tightness of the measuring chamber, near its upper end and above the inlet of the tube, comprises a joint interposed, at the level of said shoulder, between the said piston and the upper part of the inner wall of the tip member for determining the measuring chamber.

13. The device of claim 11, further comprising an O-ring compressed between the upper surface of said shoulder and an inner groove made in the lower surface of said seal seat.

14. The device of claim 1, wherein said clearance between the piston and the measuring chamber allows the passage of the liquid from the lateral tube in the direction of said chamber.

15. The device of claim 9, wherein the measuring chamber, the piston and said stop and return springs of the piston being of predetermined sizes to allow during a maximum downward stroke, said piston to reach the lower end of the measuring chamber.

16. The device of claim 15, wherein the lower end of the calibrated piston and the upper surface of a valve seat mounted in the lower part of the device have complementary truncated surfaces.

* * * * *